United States Patent
Grosse-Puppendahl et al.

(10) Patent No.: US 10,203,793 B2
(45) Date of Patent: Feb. 12, 2019

(54) UPDATING A DISPLAY BY APPLYING PRESSURE

(71) Applicant: Microsoft Technology Licensing, LLC, Redmond, WA (US)

(72) Inventors: Tobias Alexander Grosse-Puppendahl, Cambridge (GB); Stuart Taylor, Cambridge (GB); Nicholas Yen-Cherng Chen, Cambridge (GB); James Scott, Cambridge (GB); David Sweeney, Cambridge (GB); John Franciscus Marie Helmes, Steyl (NL); Stephen Edward Hodges, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 280 days.

(21) Appl. No.: 15/088,587

(22) Filed: Apr. 1, 2016

(65) Prior Publication Data
US 2017/0285828 A1    Oct. 5, 2017

(51) Int. Cl.
*G09G 3/34* (2006.01)
*G06F 3/041* (2006.01)
(Continued)

(52) U.S. Cl.
CPC .............. *G06F 3/0414* (2013.01); *B43L 1/12* (2013.01); *G02F 1/13338* (2013.01);
(Continued)

(58) Field of Classification Search
CPC ............................... G06F 3/147; G06F 3/0412
(Continued)

(56) References Cited

U.S. PATENT DOCUMENTS

| 5,930,026 A | 7/1999 | Jacobson et al. |
| 6,118,426 A | 9/2000 | Albert et al. |

(Continued)

FOREIGN PATENT DOCUMENTS

| JP | 2010085528 A | 4/2010 |
| TW | 201117071 A | 5/2011 |

(Continued)

OTHER PUBLICATIONS

Tomas, "E-Readers: Turning the Page to the Next Generation," Published on: Jun. 27, 2012, Available at <<http://www.edn.com/design/components-and-packaging/4376136/2/E-readers--Turning-the-page-to-the-next-generation>> 5 pages.
(Continued)

*Primary Examiner* — Abdul-Samad A Adediran
(74) *Attorney, Agent, or Firm* — Schwegman Lundberg & Woessner, P.A.

(57) ABSTRACT

A display device is described which can be updated by applying pressure with a passive object. The display device comprises a transparent top conductor layer, a middle conductor layer and a bottom conductor layer. The middle conductor layer is segmented into a plurality of independent areas and a pixel of the display device is defined based at least in part on the way that the middle conductor layer is segmented. The display device further comprises an electrophoretic ink layer between the top and middle conductor layers, a layer of piezo-electric material between the middle and bottom conductor layers, and an electrical connection between the bottom and top conductor layers.

20 Claims, 7 Drawing Sheets

(51) Int. Cl.
*G02F 1/1333* (2006.01)
*G02F 1/167* (2006.01)
*G06T 11/20* (2006.01)
*B43L 1/12* (2006.01)
*G06F 1/16* (2006.01)

(52) U.S. Cl.
CPC ............ *G02F 1/167* (2013.01); *G06F 1/1643* (2013.01); *G06F 3/0412* (2013.01); *G06T 11/20* (2013.01); *G09G 3/344* (2013.01); *G02F 2001/133394* (2013.01); *G02F 2001/1676* (2013.01); *G06F 2203/04102* (2013.01)

(58) Field of Classification Search
USPC ................................................ 345/107, 173
See application file for complete search history.

(56) References Cited

U.S. PATENT DOCUMENTS

| | | | |
|---|---|---|---|
| 6,373,461 | B1 | 4/2002 | Hasegawa et al. |
| 7,688,297 | B2 | 3/2010 | Zehner et al. |
| 7,733,335 | B2 | 6/2010 | Zehner et al. |
| 8,952,665 | B1 | 2/2015 | Spangler et al. |
| 2004/0119681 | A1* | 6/2004 | Albert ..................... G06F 3/147 345/107 |
| 2005/0219224 | A1 | 10/2005 | Liebenow |
| 2006/0209039 | A1* | 9/2006 | Destura ................. G06F 3/0412 345/173 |
| 2006/0262100 | A1* | 11/2006 | Van Berkel ........... G06F 3/0412 345/173 |
| 2008/0174852 | A1 | 7/2008 | Hirai et al. |
| 2008/0297878 | A1 | 12/2008 | Brown et al. |
| 2011/0050756 | A1 | 3/2011 | Cassidy et al. |
| 2013/0187900 | A1 | 7/2013 | Tsai et al. |
| 2013/0342892 | A1 | 12/2013 | Chan et al. |
| 2015/0234430 | A1 | 8/2015 | Gupta et al. |

FOREIGN PATENT DOCUMENTS

| | | |
|---|---|---|
| WO | WO2014006413 A1 | 1/2014 |
| WO | WO2014083343 A2 | 6/2014 |
| WO | 2015077200 A1 | 5/2015 |

OTHER PUBLICATIONS

"International Search Report and Written Opinion Issued in PCT Application No. PCT/US2017/024405", dated Sep. 4, 2017, 20 Pages.

* cited by examiner

UPDATING A DISPLAY BY APPLYING PRESSURE

BACKGROUND

Electronic paper (or e-paper) is used for e-reader devices because it only requires power to change the image displayed and does not require continuous power to maintain the display in between. The electronic paper can therefore hold static images or text for long periods of time (e.g. from several minutes to several hours and even several days, months or years in some examples) without requiring significant power (e.g. without any power supply or with minimal power consumption). There are a number of different technologies that are used to provide the display, including electrophoretic displays, electrochromic and electrowetting displays. Many types of electronic paper display are also referred to as "bi-stable" displays because they use a mechanism in which a pixel can move between stable states (e.g. a black state and a white state) when powered but holds its state when power is removed.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A display device is described which can be updated by applying pressure with a passive object. The display device comprises a transparent top conductor layer, a middle conductor layer and a bottom conductor layer. The middle conductor layer is segmented into a plurality of independent areas and a pixel of the display device is defined based at least in part on the way that the middle conductor layer is segmented. The display device further comprises an electrophoretic ink layer between the top and middle conductor layers, a layer of piezo-electric material between the middle and bottom conductor layers, and an electrical connection between the bottom and top conductor layers.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
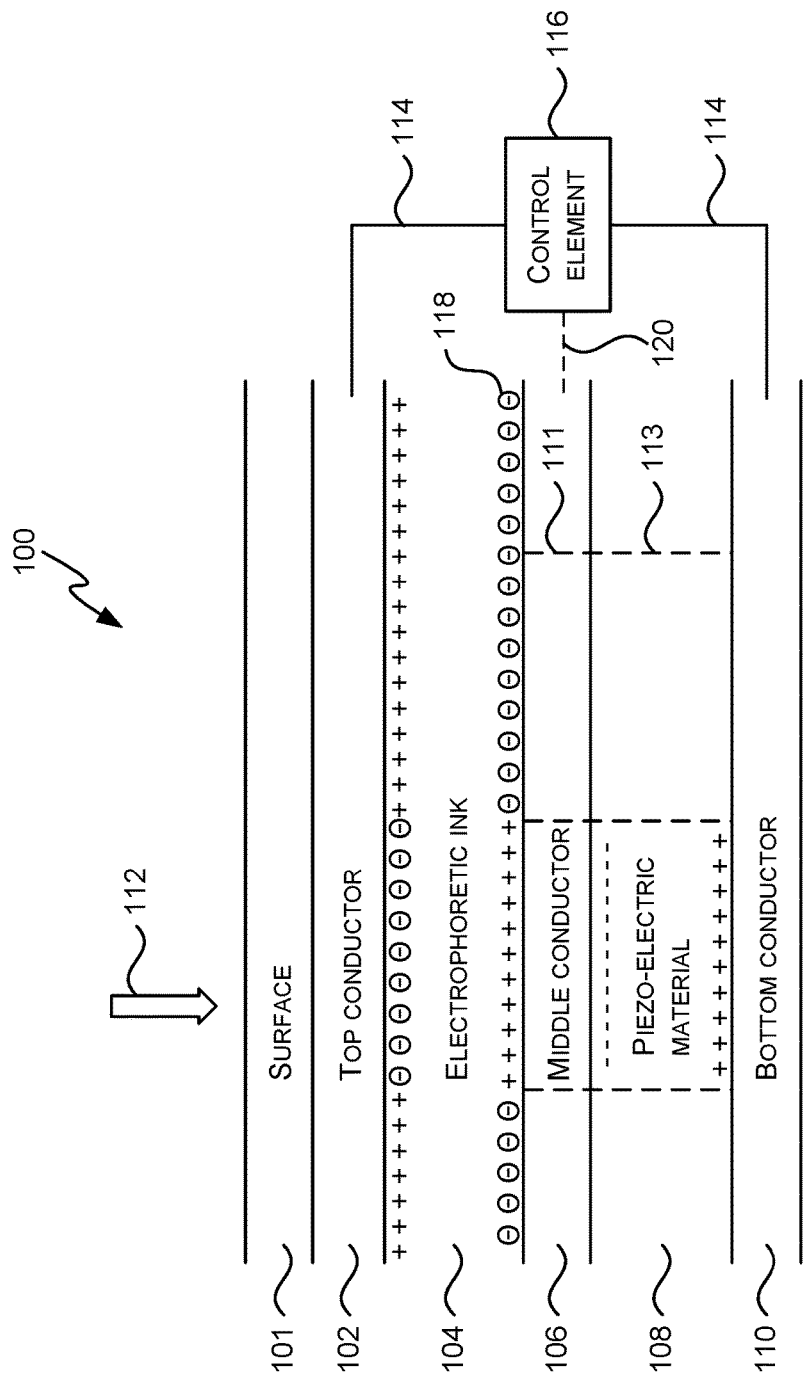
FIG. 1 is a schematic diagram showing an example display device.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

E-reader devices often use a bi-stable display because they have much lower power consumption than backlit liquid crystal displays (LCDs) or LED displays which require power to be able to display content. In contrast, a bi-stable display requires power to change state (i.e. change the image/text displayed) but does not require power to maintain a static display. This enables the display to be "always on" (i.e. always displaying content, in contrast to emissive displays which typically have a power saving mode when the display is switched off). Although such e-reader devices do not need to be charged as frequently as a device which comprises an emissive display, they still need to be charged occasionally (e.g. every few weeks) and this requires a user to manually connect them to an electrical power source.

The embodiments described below are not limited to implementations that solve any or all of the disadvantages of known display devices.

Described herein is a display device which comprises an electronic paper display and a piezo-electric layer underneath the electronic ink layer. The piezo-electric layer generates a voltage differential when pressure is applied to it and this can be used to directly drive segments or pixels within the electronic paper display. This enables a user to write or draw on the electronic paper display using a passive object (i.e. an object that does not include any electronics, such as a plastic stylus, the lid of a conventional pen, a die stamp, the user's finger, etc.). This may be described as 'direct virtual inking' as it directly mimics the effect of writing on paper with a pen.

The display device may also comprise an arrangement of passive components such that changes made in response to applied pressure are retained once the pressure is released and/or such that a user can select whether the application of pressure changes pixels from white to black or from black to white. Such passive components may therefore enable a user to both write on the display (e.g. to change pixels from white to black) and to erase displayed content (e.g. to change pixels from black to white).

The display device described herein provides a passive writing surface that does not require a special writing implement (e.g. it does not require an active or powered writing implement) or power source in order to be able to draw/write on the display device. It has reduced latency compared to conventional e-readers because of the direct processing in the pixels (i.e. the effect is local to the pixels involved). The display device described herein is easily erasable and reusable compared to paper.

In various examples, the display device additionally comprises per-pixel storage elements which record the current state of each pixel in the electronic paper display and which enable the subsequent reading of the content of the display device (e.g. by a separate electronic device). This enables a user to generate and store a digital record of whatever they have written or drawn on the display device. This digital record may then be shared remotely or duplicated. Depending on the particular arrangement, this recording of state may also not require a battery (or similar power source) within the display device In various examples, the display device additionally comprises active electronics to enable various functionality as is described in more detail below and in various examples, the display device can also render received content on the electronic paper display, thereby enabling a user to annotate the rendered content and these annotations may, in various examples, be able to be recovered in a digital form. In various examples which include per-pixel storage elements, it may be possible to store content onto the display device by storing content in the per-pixel storage elements and then render that content on the display using the active electronics.

The term "electronic paper" is used herein to refer to display technologies which reflect light (like paper) instead of emitting light like conventional LCD displays. As they are reflective, electronic paper displays do not require a significant amount of power to maintain an image on the display and so may be described as persistent displays. Many electronic paper displays are multi-stable displays. In some display devices, an electronic paper display may be used together with light generation in order to enable a user to more easily read the display when ambient light levels are too low (e.g. when it is dark). In such examples, the light generation is used to illuminate the electronic paper display to improve its visibility rather than being part of the image display mechanism and the electronic paper does not require light to be emitted in order to function.

The term "multi-stable display" is used herein to describe a display which comprises pixels that can move between two or more stable states (e.g. a black state and a white state and/or a series of grey or colored states). Bi-stable displays, which comprise pixels having two stable states, are therefore examples of multi-stable displays. A multi-stable display can be updated when powered, but holds a static image when not powered and as a result can display static images for long periods of time with minimal or no external power. Consequently, a multi-stable display may also be referred to as a "persistent display" or "persistently stable" display. An electrophoretic ink layer is an example of a multi-stable layer which can be changed (or controlled) by applying electric fields. Other examples include a cholesteric liquid crystal layer or a bi-stable electrowetting display layer which is controlled using electric fields or currents applied via electrodes on the faces of a the layer.

FIG. 1 is a schematic diagram showing an example display device 100 which comprises a top conductor layer 102, an electrophoretic ink layer 104, a middle conductor layer 106, a layer of piezo-electric material 108 and a bottom conductor 110. As shown in FIG. 1, the electrophoretic ink layer 104 is between the top and middle conductor layers 102, 106 and the piezo-electric material 108 is between the middle and bottom conductor layers 106, 110. As indicated by the dotted lines 111 in FIG. 1 and shown in FIG. 2, the middle conductor layer 106 is not a continuous layer but is instead divided into a plurality of areas 202 with gaps 204 in between. In the example shown in FIG. 1, the top and bottom conductor layers 102, 106 are both continuous; however, in other examples (as described below), one or both of these conductors 102, 106 may also be segmented.

An electrical connection 114 is provided between the bottom and top conductor layers 110, 102 and this electrical connection 114 may include a control element 116.

Where a control element 116 is provided, it may only comprise passive components (e.g. components which do not introduce net energy into the circuit and do not require a source of power e.g. diodes, resistors, capacitors, etc.). In other examples, however (as described below), the control element 116 may additionally comprise one or more active components (e.g. one or more transistors and/or a microcontroller or processor). In examples comprising a control element 116, there is no direct connection between the conductor layers and the current from the piezo-electric layer 108 is instead directed by passive components (e.g. a switch, one or more diodes or other current-directing elements, etc.) and/or active components within the control element 116.

The top conductor 102 is made from a transparent conductive material, such as indium tin oxide (ITO) and the other two conductors may be made from a transparent or opaque conductive material (e.g. from copper). As shown in FIG. 1, the top conductor 102 may be covered by a transparent protective surface layer 101 (e.g. polyethylene terephthalate, PET) which provides the front, touchable surface of the display device 100. Alternatively, the top conductor 102 may be formed from a material which is robust (e.g. it can withstand a user touching it without being damaged) and in such examples, the top conductor 102 may provide the front, touchable surface of the display device 100 and the protective surface layer 101 may be omitted.

Although the description herein refers to the orientation of layers as shown in FIG. 1 (e.g. with the top conductor 102 on top of the electrophoretic ink layer 104), it will be appreciated that in use the display device 100 may not necessarily be horizontal but may instead be vertically oriented or angled in any way.

In response to the application of pressure (as indicated by arrow 112) which deforms the piezo-electric material 108, a voltage differential is generated across the piezo-electric material 108 (as indicated by the plus and minus signs in FIG. 1) and hence there is also a voltage differential between the two adjacent conductor layers (i.e. between the bottom conductor 110 and the portion(s) of the middle conductor 106 in the region where the deformation occurs). If the bottom conductor 110 is electrically connected to the top conductor 102 (via the electrical connection 114), the top conductor 102 is at the same potential as the bottom conductor layer 110 and so a voltage difference also exists between the top conductor 102 and the portion(s) of the middle conductor 106 in the region where the deformation occurs and depending upon the state of the electrophoretic ink layer 104, this can change the appearance of the display (e.g. by attracting the negatively charged black ink particles 118 to the surface of the display). This therefore enables a user to write on the display device 100 using a passive object (e.g. a plastic stylus).

The term 'pixel' is used herein to refer to an independently controllable portion of the display device 100, e.g. as defined by the patterning in the middle conductor layer 106. The piezo-electric material 108 may also be segmented in a matching pattern (as indicated by dotted lines 113) or it may be a continuous layer. In various examples, each separate area of the middle conductor layer 106 corresponds to a pixel (i.e. the middle conductor layer 106 may be patterned along pixel boundaries). In other examples however (as described below), the pixel boundaries may be defined by a combination of the patterning of the top and middle conductor layers 102, 106.

Depending upon the response characteristics of the piezo-electric material 108 and the implementation requirements for the display device 100, the piezo-electric material 108 may also be segmented along pixel boundaries (e.g. by providing channels in the piezo-electric material, indicated by dotted lines 113) may be used to ensure that the effect of any deformation is localized (i.e. by reducing mechanical coupling), e.g. such that pressure on the display only results in a voltage differential being generated in those pixels to which the pressure is applied. In other examples, a piezo-electric material may be used that provides sufficient locality of the response for the particular implementation.

As described above, when pressure is applied a voltage differential is generated across one or more pixels of the display which, depending upon the initial state of the electrophoretic ink layer 104 prior to the application of pressure, may result in a change in state of the electrophoretic ink layer 104 (e.g. assuming that the control element 116 is in a state that permits current flow, the pixels where the pressure is applied may change from white to black, unless they are already black when they will not change). In the absence of the control element 116, when the pressure is released, the voltage differential may be reversed (e.g. dependent upon how long the initial pressure was applied for) and where the voltage differential is reversed, any change to the state of the electrophoretic ink layer 104 is also reversed. Where the control element 116 is provided, it may comprise one or more passive components which control or restrict the direction of current flow (e.g. a switch and/or diode or a more complex arrangement of passive components) such that the reverse voltage differential is not generated across the electrophoretic ink layer 104 and any change in state of the electrophoretic ink layer 104 (as a consequence of applied pressure) is retained when the pressure is released.

In an example, the control element 116 may comprise a switch and a user may be able to control whether they are darkening or whitening the pixels by activating the switch while pressing. In another example, the control element 116 may comprise two current-directing elements (e.g. diodes) each of which has a switch (which could be two separate switches, one per current-directing element, or a single switch that activates one current-directing element but not the other, or vice versa). In such an example with a single switch, when the switch was one way, only whitening would occur, and when the switch was the other way, only darkening would occur. The switch may, for example, be a push button that defaulted to one option (e.g. darkening of pixels when pressure applied) or a latching switch. In a yet further example, the control element 116 may be a microcontroller-controlled switch, whereby the microcontroller could measure voltage between the bottom conductor and the middle conductor, and permit current to flow between the bottom and top conductors at specific times (e.g. based on the measured voltage).

In various examples, the control element 116 may operate in a plurality of different modes which are selectable by the user (e.g. by means of a switch or one or more buttons). In such an example, the control element 116 may operate in two of more of the following modes: (1) write, (2) erase, (3) neither write nor erase. Of these, the third mode may be used when the display device 100 is not being used (e.g. when it is being carried around) to prevent the display being inadvertently changed (e.g. due to it being squashed in a bag) and in this mode, the top conductor layer 102 may either not be electrically connected to the bottom conductor layer 110 (i.e. such that current cannot flow from one potential to another) or all the conductor layers 102, 106, 110 may be connected to ground (i.e. such that the piezo-electric material 108 is discharged instantly when pressure is applied). Depending upon the implementation, the write mode may result in pixels changing from white to black (e.g. for a display device for which white is the background color) or black to white (e.g. for a display device which has a black background) and the erase mode results in the opposite change. The read and write modes may be implemented by restricting current flow (e.g. using a diode or other current-directing element) in one or other direction between the top and bottom conductor layers 102, 110. For the purposes of the following explanation only, it is assumed that the display device operates with a white background such that the write mode changes pixels from white to black and the erase mode changes pixels from black to white.

As described above, the display device 100 shown in FIG. 1 enables separate and independent modification of each pixel in response to mechanical contact from a passive implement. Additional functionality may also be provided through the addition of extra layers (e.g. at the bottom of the structure shown in FIG. 1), through the segmentation of the top and/or bottom conductor layers 102, 110, and/or through the addition of more components (including, in various examples, some active components) within the control element 116 and various examples are described below.

In various examples, the control element 116 may detect the voltage difference generated by the piezo-electric material 108 in response to applied pressure (e.g. using an optional connection 120 between the middle conductor 106 and the control element 116) and only electrically connect the two conductors together (such that current can flow and the voltage difference can be applied across the electrophoretic ink layer 104) if the voltage difference exceeds a pre-defined threshold. In this way the response curve for the display device may be altered from a gradual change in appearance of a pixel with increasing applied pressure to a more abrupt step change (e.g. with the direct inking being non-existent or black, rather than a shade of grey). This may prevent inadvertent updating of the display due to a user resting their hand on the display or something pressing lightly on the display in transit.

Figure 3:
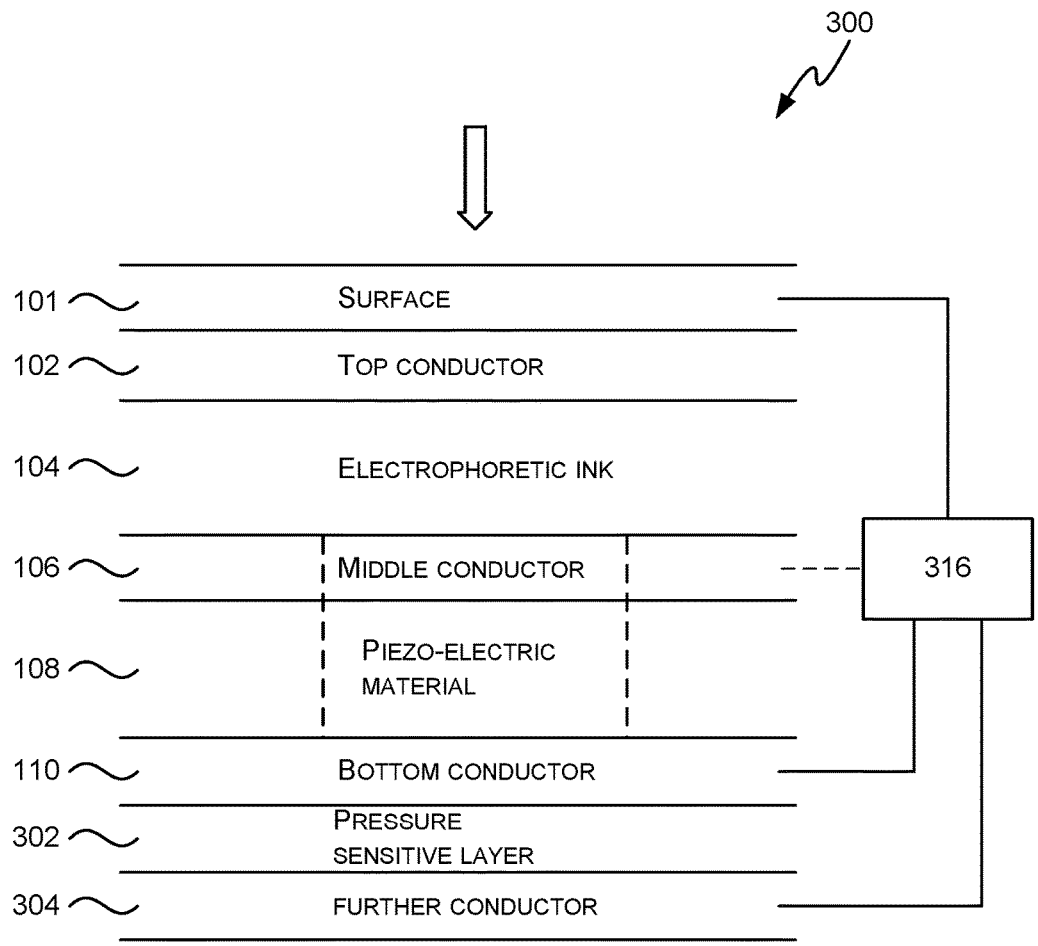
FIG. 3 is a schematic diagram showing another example display device.

Alternatively, the structure shown in FIG. 1 may be augmented with a pressure-sensitive layer which is used by the control element 316 to detect the applied pressure, as shown in FIG. 3. In this example, the display device 300 comprises two additional layers: a pressure-sensitive layer 302 and a further conductor layer 304 and the control element 316 comprises an additional connection to the further conductor layer 304. The pressure-sensitive layer 302 is positioned between the bottom conductor layer 110 and the further conductor layer 304.

The pressure-sensitive layer 302 in FIG. 3 may, for example, be a continuous layer formed from a piezo-electric material (which may be the same material as in layer 108) and which generates a voltage differential between the bottom conductor 110 and the further conductor layer 304 (both of which may be continuous layers) in response to applied pressure anywhere on the display device 300. This voltage differential may be detected by the control element 316 and used as an input to control whether to electrically connect the top and bottom conductors 102, 110 (as described above), e.g. according to a pre-defined threshold. The arrangement shown in FIG. 3, including the pressure-sensitive layer 302, may simplify the detection of applied pressure in implementations where the middle conductor layer 106 is pixelated, because in such examples, reading the voltage differential across the original piezo-electric layer 108 (i.e. between the middle and bottom conductors, 106, 110) may be more difficult.

The pressure-sensitive layer 302 in FIG. 3 may, alternatively, be a formed from a continuous layer of force-sensing resistor material (FSR) which changes in resistance in response to pressure anywhere on the display device 300 and which may be more robust and lower cost than piezo-electric material. This change in resistance can be detected by the control element 316 (which in this example may comprise active components in addition to, or instead of, passive components) and used as an input to control whether to electrically connect the top and bottom conductors 102, 110 (as described above).

In further examples, the pressure-sensitive layer 302 may be segmented along pixel boundaries (e.g. in a similar manner to that shown in FIG. 2) or other boundaries irrespective of whether it is made from FSR, a piezo-electric material or another pressure sensitive material. By providing a segmented pressure-sensitive layer 302, the thresholding operation can be performed on a more localized basis (e.g. such that different pressure levels in different regions of the display have different effects, for example such that a region of the display is mainly read only, except if a large pressure is applied), but this does require additional connections from each segment of the pressure-sensitive layer 302 to the control element 316. This may, for example, be used to write protect regions containing certain types of content or to write protect the entire page except for a signature/date box of a form.

Figure 4:
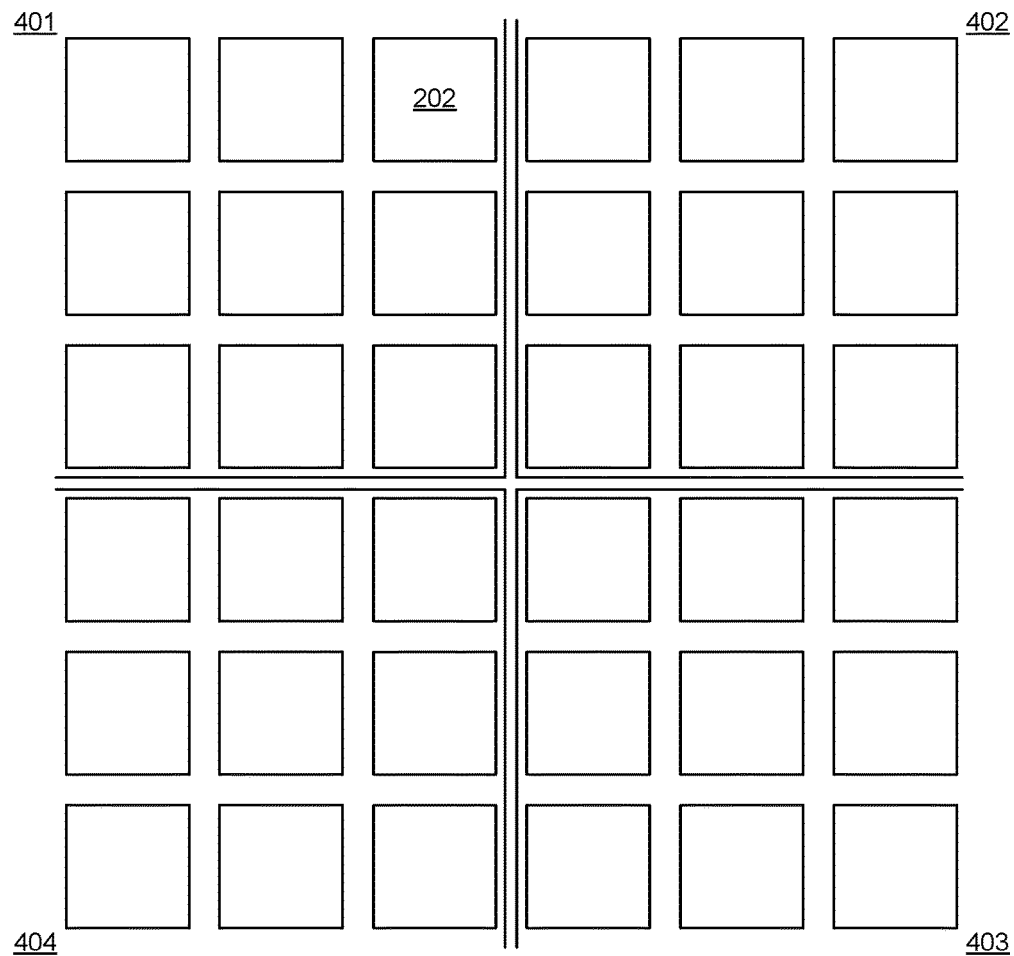
FIG. 4 is a schematic diagram showing an example arrangement of layers in the device of FIG. 3 in more detail.

In various examples of the display devices 100, 300 shown in FIGS. 1 and 3, the middle and bottom conductors 106, 110 may be segmented and the top conductor 102 may be a continuous layer. Where the bottom conductor 110 is segmented, each portion of the bottom conductor 110 may be connected separately to the control element 116, 316. By segmenting the bottom conductor 110, the control element 116, 316 may be able to control which areas of the display device 100, 300 are enabled (i.e. such that a user pressing on the area could cause the display to change) and which areas are not enabled (i.e. such that a user pressing on the area cannot cause the display to change). An example is shown in FIG. 4, where the middle conductor 106 is segmented along the pixel boundaries and the bottom conductor 110 is segmented into four portions 401-404. Accordingly, the ability to update the display (through the application of pressure, as described above) may be controlled independently for the four regions corresponding to the four portions 401-404 of the bottom conductor 110.

In various examples, the middle and top conductors 106, 102 may be segmented and the bottom conductor 110 may be a continuous layer. Where the top conductor 102 is segmented, each portion of the top conductor 102 may be connected separately to the control element 116, 316. By segmenting the top conductor 102, the control element 116, 316 may be able to control which areas of the display device 100, 300 are enabled (i.e. such that a user pressing on the area could cause the display to change) and which areas are not enabled (i.e. such that a user pressing on the area cannot cause the display to change). In various examples, the middle conductor 106 may be segmented along the pixel boundaries and the top conductor 102 may be segmented into fewer regions (e.g. in a similar manner to that shown in FIG. 4).

Figure 2:
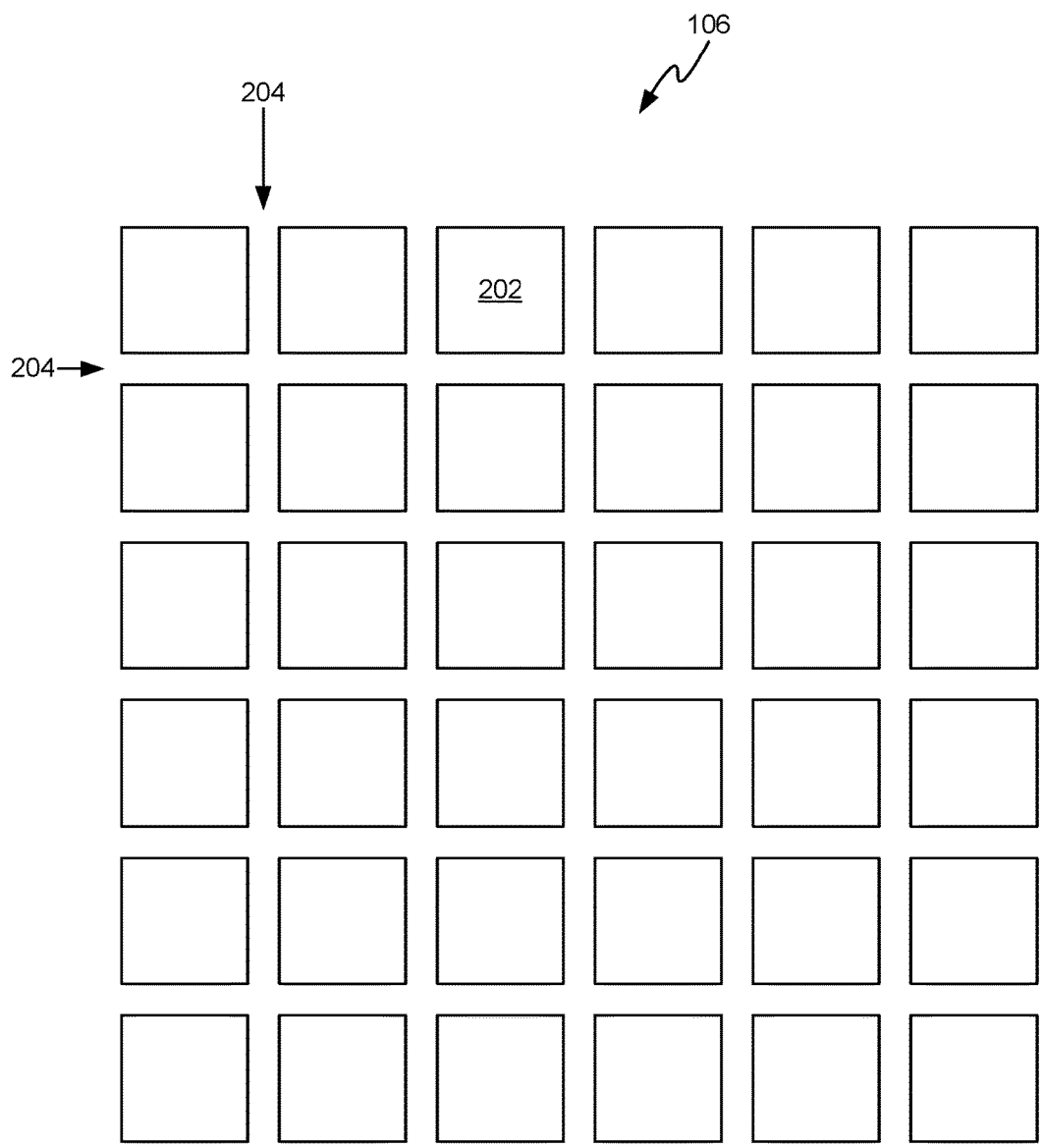
FIG. 2 is a schematic diagram showing an example arrangement of layers in the device of FIG. 1 in more detail.
Figure 5:
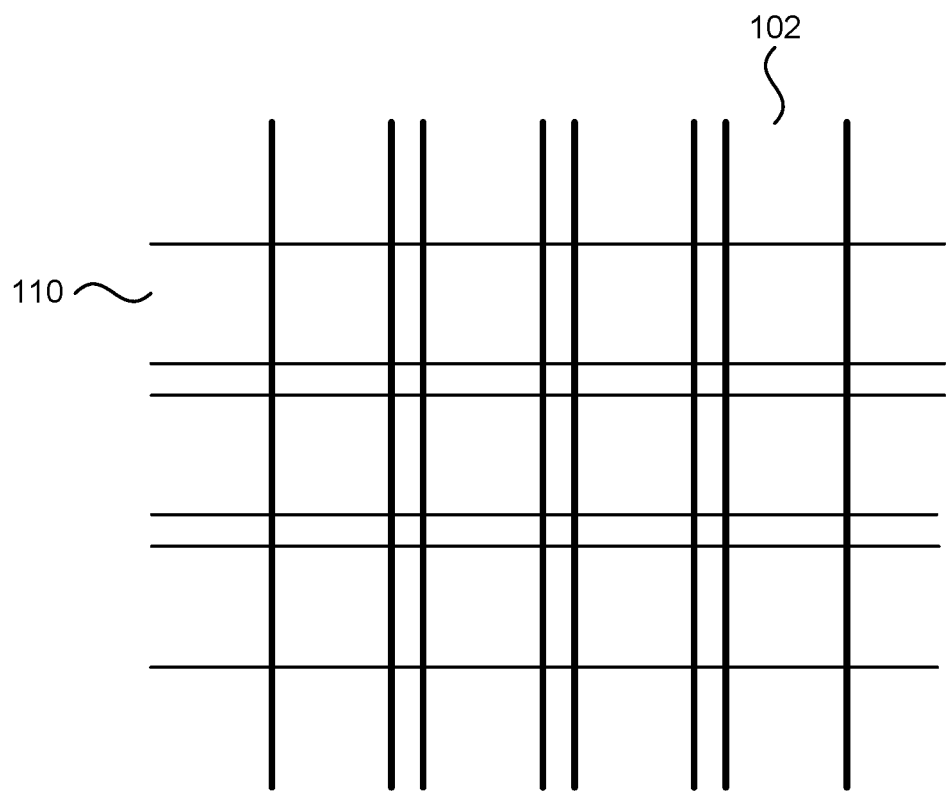
FIG. 5 is a schematic diagram showing another example arrangement of layers in the device of FIG. 1 or 3 in more detail.

The segmentation of the top conductor 102 may, in addition or instead, be used to enable the electrophoretic ink layer 104 to be driven (i.e. to actively control the state of each pixel) such that content can be actively rendered on the display device (where the content may be generated externally to the display device or may be generated and stored in the display device, as described above, and then re-rendered on the display, for example to enable a user to flip back to a previous drawing). This, in combination with the direct virtual inking mechanism described above, enables a user to annotate the displayed content by writing on the display using a passive object. In order that individual pixels can be driven, the top conductor 102 may be segmented along pixel column boundaries and the bottom conductor 110 may be segmented along pixel row boundaries, e.g. as shown in FIG. 5. Alternatively, the top conductor 102 may be segmented along pixel row boundaries and the bottom conductor 110 may be segmented along pixel column boundaries. The middle conductor layer 106 is, in either arrangement, segmented along pixel boundaries, as shown in FIG. 2. Additional driving electronics may be provided within the control element 116, 316 or within a separate element or may be provided externally to the display device 100, 300 which may comprise a connector or exposed electrical connections to enable electrical connections to be made to a separate module comprising the driving electronics.

When driving the pixels in the electrophoretic ink layer 104, the top and bottom conductor layers 102, 110 are not electrically connected together (as in some of the earlier examples). Instead, a voltage difference is applied between a row conductor (in either the top or bottom conductor layers 102, 110) and a column conductor (in the other of the top and bottom conductor layers 102, 110) and this provides a voltage difference across one pixel of the electrophoretic ink layer 104 and can be used to selectively drive it between black and white. During the time taken to render content, a user cannot write on the display device (i.e. direct virtual inking is not possible).

Once the content has been rendered, the display device changes mode of operation and a user can then write on the display device. When a user applies pressure to the display surface (e.g. with a passive object), this generates a voltage difference between a pixel of the middle conductor layer 106 and a row/column in the bottom conductor layer 110. The bottom conductor layer 110 is now electrically connected (via the control element 116, 316) to all of the parts of the top connector 102 (which therefore acts as if it is a continuous conductive layer) and so a voltage difference is generated across the electrophoretic ink layer 104 between the top connector 102 and the pixel of the middle conductor layer 106 which, depending upon the current state of the pixel (and whether the display is set to write or erase), may result in the pixel changing between white and black.

In a further example which uses the layer structure shown in FIG. 3, the top conductor 102 may be segmented along pixel column boundaries, the middle conductor 106 may be segmented along pixel row boundaries, the bottom conductor 110 may be a continuous (i.e. common) layer and the further conductor 304 may be segmented along the same pixel column boundaries as the top conductor 102. This enables rendering of images on the display (by generating a voltage across the electrophoretic ink layer 104, i.e. between the top and middle conductors 102, 106) and also annotation, by connecting the bottom conductor 110 to the specific top conductor layer column where the pressure is being applied. This is detected using the pressure sensitive layer 302 and further conductor 304 (which is segmented in the same way as the top conductor 102).

Figure 6:
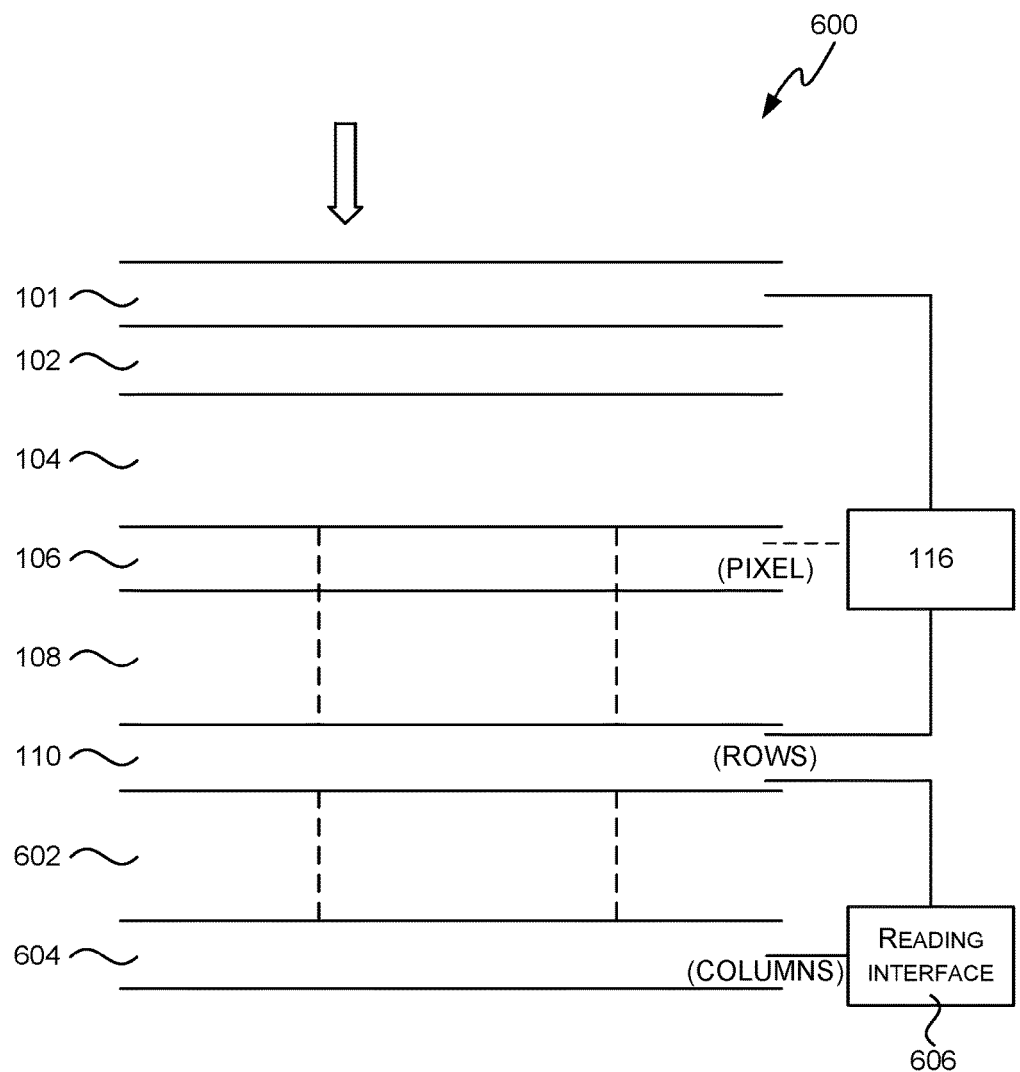
FIG. 6 is a schematic diagram showing a further example display device.

FIG. 6 is a schematic diagram showing another example display 600. The display device 600 shown in FIG. 6 enables a user's annotation (or other writing on the display device) to be read out at the time of writing by another device (connected via the reading interface 606) and stored external to the display device. In a variation on that shown in FIG. 6, the display device 600 may include the reading circuitry (e.g. in place of the reading interface 606) and the user's annotation may be stored within the display device. In a similar manner to the display device 300 shown in FIG. 3, in FIG. 6 the structure of FIG. 1 is augmented with two additional layers. The two extra layers in the display device 600 shown in FIG. 6 are a second piezo-electric layer 602 and a further conductor layer 604 with the second piezo-electric layer 602 being positioned between the bottom conductor layer 110 and the further conductor layer 604. In this configuration, the bottom conductor layer 100 is segmented along pixel row or column boundaries and the further conductor layer 604 is segmented along the other of pixel row or column boundaries (e.g. in an arrangement similar to that shown in FIG. 5 for the bottom and further conductor layers 110, 604 instead of the top and bottom conductor layers 102, 110).

When a user applies pressure to the display surface (e.g. with a passive object), this generates a voltage difference between a pixel of the middle conductor layer 106 and a row/column in the bottom conductor layer 110. The bottom conductor layer 110 is electrically connected (via the control element 116, 316) to the top connector 102 (which is, or acts like, a continuous conductive layer) and so a voltage difference is generated across the electrophoretic ink layer 104 between the top connector 102 and the pixel of the middle conductor layer 106 which, depending upon the current state of the pixel (and whether the display is set to write or erase), may result in the pixel changing between white and black.

At the same time, a voltage difference is generated between the row/column in the bottom conductor layer 110 and a column/row in the further conductor layer 604. As each part of the bottom and further conductor layers 110, 604 are connected to the reading interface 606, an external device can detect which row and which column the voltage difference is generated between and hence determine which pixel in the display device 600 is being affected by the user applied pressure.

Figure 7:
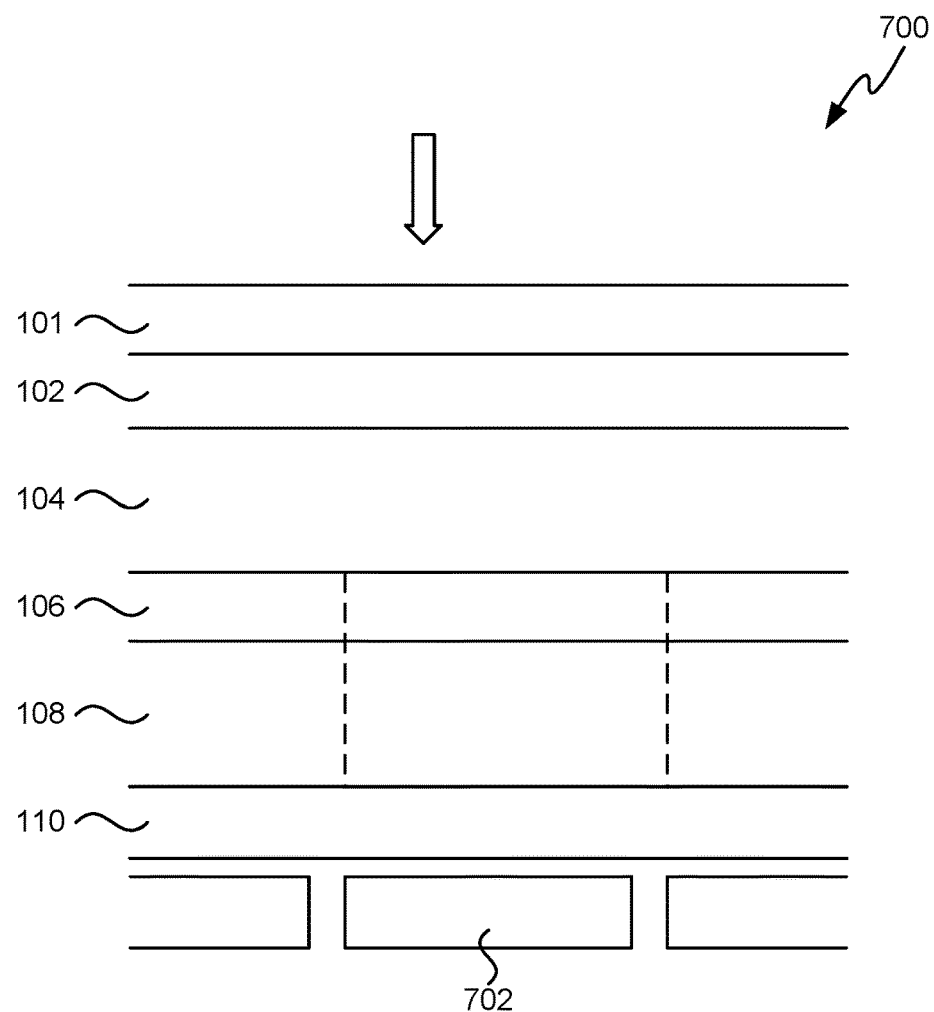
FIG. 7 is a schematic diagram showing another example display device.

The arrangement shown in FIG. 6 and described above enables an external device to read out a user's annotations at the time they are written and then store that data. Alternatively, as shown in FIG. 7, an array of storage elements 702 (e.g. flip-flops, flash memory elements or storage capacitors), with one per pixel, may be provided, and these are used to record the change in state of a pixel (e.g. to store charge generated or otherwise update their state) when a user presses on pixels on the display device 700. The storage elements (e.g. the state of each flip-flop or flash memory element or the charge in each storage capacitor) may subsequently be read out, e.g. via a reading interface comprising row/column addressing and a plurality of transistors to achieve an active matrix or alternatively a serial architecture may be used, whereby all the pixels are connected in a continuous chain and data is clocked out serially (not shown in FIG. 7). The charge in a storage capacitor is subject to leakage after a short time and so where these are used as the per-pixel storage elements 702, the read-out may be performed more frequently.

Although the present examples are described and illustrated herein as being implemented in a display system as shown in FIGS. 1, 3, 5 and 7, the system described is provided as an example and not a limitation. As those skilled in the art will appreciate, the present examples are suitable for application in a variety of different types of display systems.

It will be appreciated that aspects of the different display devices described above may be combined in any way. For example, a display device may be configured to perform any one or more of: thresholding, active rendering, reading at the time of writing and reading after writing in addition to the basic configuration that enables a user to write on the display surface with a passive implement using energy harvested locally to the pixel under the display surface (i.e. with deformation of the piezo-electric layer 108 causing a localized change in the electrophoretic ink layer 104).

The display devices described herein provide a low complexity display which enables direct virtual inking and does not require a batter or any active integrated circuits. The display devices support direct virtual inking by directly modifying pixels or segments on the bistable display based on pressure (and the resulting deformation). As described above, an arrangement of passive components may be used to enable modification, erasing and/or locking of the annotations made by a user.

The display devices described herein may be of any size and shape and need not be planar. The display device may comprise many small pixels or fewer, larger pixels and although FIG. 2 shows square pixels, the pixels may be of any shape and the various pixels in a display device need not all be the same shape. The layer structure described herein may be made very thin and may be flexible as no additional electronics are required. In various examples the display devices may be large, situated displays (e.g. operating like a whiteboard/chalkboard or other collaborative display).

A first further example provides a display device which can be updated by applying pressure with a passive object, the display device comprising: a transparent top conductor layer; a middle conductor layer segmented into a plurality of independent areas, wherein a pixel of the display device is defined based at least in part on the segmentation of the middle conductor layer; a bottom conductor layer; an electrophoretic ink layer between the top and middle conductor layers; a layer of piezo-electric material between the middle and bottom conductor layers; and an electrical connection between the bottom and top conductor layers.

Each area in the middle conductor layer may correspond to a pixel of the display device.

In the display device and in response to pressure applied, a locally generated voltage differential within the piezo-electric material enables a local change in the electrophoretic ink layer.

The layer of piezo-electric material may be segmented along pixel boundaries.

The display device may further comprise a control element within the electrical connection and wherein the control element comprises passive components configured to selectively control a direction of current flow between the top and bottom conductor layers. In a first mode of operation, the control element may be configured to only permit current to flow from the top to the bottom conductor layer. In a second mode of operation, the control element may be configured to only permit current to flow from the bottom to the top conductor layer. In a third mode of operation, the control element may be configured to prevent current between the top and bottom conductor layers.

One of the top and bottom conductor layers may be segmented along pixel row boundaries and the other of the top and bottom conductor layers may be segmented along pixel column boundaries.

The display device may further comprise control circuitry connected to the segmented top and bottom conductor layers and arranged to selectively generate an electric field across one or more pixels of the electrophoretic ink layer to render an image on the display device.

The display device may further comprise a further conductor layer segmented along one of pixel row or pixel column boundaries and wherein the bottom conductor layer is segmented along the other of pixel row or pixel column boundaries; a second layer of piezo-electric material between the bottom and further conductor layers; and a reading interface connected to the bottom and further conductor layers and arranged to expose electrical connections to the bottom and further conductors to a separate device, such that when pressure is applied to the display device, the separate device can determine a position on the display device of the applied pressure.

The display device may further comprise a plurality of storage elements, one connected to each pixel in the display device and wherein, in response to pressure applied to a pixel, state of the connected storage element is updated.

The display device may further comprise a further conductor layer; a pressure-sensitive layer between the bottom conductor layer and the further conductor layer; and a control element connected to the top, bottom and further conductor layers and arranged to selectively control current flow between the top and bottom conductor layers in response to a detected change in resistance or voltage differential between the bottom and further conductor layers. The pressure-sensitive layer may comprise a layer of force-sensing resistor material and the control element may be arranged to selectively control current flow between the top and bottom conductor layers in response to a detected change in resistance. The pressure-sensitive layer may alternatively comprise a second layer of piezo-electric material and the control element may be arranged to selectively control current flow between the top and bottom conductor layers in response to a detected change in voltage differential.

The display device may be flexible.

In various implementations, the display device of the first further example does not include any active electronics.

In various implementations, the display device of the first further example does not include a battery.

A second further example provides a method of updating an electrophoretic ink display comprising: generating, in a layer of piezo-electric material and in response to applied pressure, a voltage differential between a first conductor layer on one side of the layer of piezo-electric material and a second conductor layer on the other side of the layer of piezo-electric material; and selectively connecting the second conductor layer to a third conductor layer to generate a voltage differential across a layer of electrophoretic ink between the first and third conductor layers, wherein the first conductor layer is segmented into a plurality of separate areas, each area corresponding to a pixel of the display.

Selectively connecting the second conductor layer to a third conductor layer may comprise selectively controlling a direction of current flow between the second and third conductor layers.

The third conductor layer may be segmented along a first one of pixel row and column boundaries and the second conductor layer may be segmented along a second one of pixel row and column boundaries and the method may further comprise: applying an externally generated voltage differential between a segment of the third conductor layer and a segment of the second conductor layer to control a pixel of the display.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. Examples of tangible storage media include computer storage devices comprising computer-readable media such as disks, thumb drives, memory etc. and do not include propagated signals. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A display device, updated by applying pressure with a passive object, the display device comprising:
   a transparent top conductor layer;
   a middle conductor layer segmented into a plurality of independent areas, each independent area corresponding to a pixel of the display device, wherein a respective pixel of the display device is defined based at least in part on the segmentation of the middle conductor layer;
   a bottom conductor layer;
   an electrophoretic ink layer between the top and middle conductor layers;
   a layer of piezo-electric material between the middle and bottom conductor layers, wherein the layer of piezo-electric material is segmented;
   a plurality of storage elements, one connected to each pixel of the display device; and
   an electrical connection between the bottom and top conductor layers.

2. The display device according to claim 1, wherein each area in the middle conductor layer corresponds to a pixel of the display device.

3. The display device according to claim 1, wherein in response to pressure applied, a locally generated voltage differential within the piezo-electric material enables a local change in the electrophoretic ink layer.

4. The display device according to claim 1, wherein the layer of piezo-electric material is segmented along pixel boundaries.

5. The display device according to claim 1, further comprising a control element within the electrical connection and wherein the control element comprises passive components configured to selectively control a direction of current flow between the top and bottom conductor layers.

6. The display device according to claim 5, wherein in a first mode of operation, the control element is configured to only permit current to flow from the top to the bottom conductor layer.

7. The display device according to claim 5, wherein in a second mode of operation, the control element is configured to only permit current to flow from the bottom to the top conductor layer.

8. The display device according to claim 5, wherein in a third mode of operation, the control element is configured to prevent current between the top and bottom conductor layers.

9. The display device according to claim 1, wherein the top conductor layer is segmented along pixel row boundaries and the bottom conductor layer is segmented along pixel column boundaries.

10. The display device according to claim 9, further comprising control circuitry connected to the segmented top and bottom conductor layers and arranged to selectively generate an electric field across one or more pixels of the electrophoretic ink layer to render an image on the display device.

11. The display device according to claim 1, further comprising:
    a further conductor layer segmented along pixel row boundaries and wherein the bottom conductor layer is segmented along pixel column boundaries;
    a second layer of piezoelectric material between the bottom and further conductor layers; and
    a reading interface connected to the bottom and further conductor layers and arranged to expose electrical connections to the bottom and further conductor layers to a separate device, such that when pressure is applied to the display device, the separate device determines a position on the display device of the applied pressure.

12. The display device according to claim 1,
    wherein, in response to pressure applied to a pixel, state of the connected storage element is updated.

13. The display device according to claim 1, further comprising:
    a further conductor layer;
    a pressure-sensitive layer between the bottom conductor layer and the further conductor layer; and
    a control element connected to the top, bottom and further conductor layers and arranged to selectively control current flow between the top and bottom conductor layers in response to a detected change in resistance or voltage differential between the bottom and further conductor layers.

14. The display device according to claim 13, wherein the pressure-sensitive layer comprises a layer of force-sensing resistor material and the control element is arranged to selectively control current flow between the top and bottom conductor layers in response to a detected change in resistance.

15. The display device according to claim 13, wherein the pressure-sensitive layer comprises a second layer of piezo-electric material and the control element is arranged to selectively control current flow between the top and bottom conductor layers in response to a detected change in voltage differential.

16. The display device according to claim 1, wherein the display device is flexible.

17. The display device according to claim 1, wherein the display device does not include at least one of active electronics or a battery.

18. A method of updating an electrophoretic ink display comprising:
    generating, in a layer of piezo-electric material and in response to applied pressure, a voltage differential between a first conductor layer on one side of the layer of piezo-electric material and a second conductor layer on a side of the layer of piezo-electric material opposite the first conductor layer, wherein the layer of piezo-electric material is between the first conductor layer and the second conductor layer; and selectively connecting the second conductor layer to a third conductor layer to generate a voltage differential across a layer of electrophoretic ink between the first and third conductor layers, wherein the layer of electrophoretic ink is on a side of the first conductor layer opposite a side of the first conductor layer which is adjacent to the layer of piezo-electric material wherein the first conductor layer is segmented into a plurality of separate areas, each area corresponding to a pixel of the display.

19. The method according to claim 18, wherein selectively connecting the second conductor layer to the third conductor layer comprises selectively controlling a direction of current flow between the second and third conductor layers.

20. The method according to claim 18, wherein the third conductor layer is segmented along a first pixel row and column boundary and the second conductor layer is segmented along a second pixel row and column boundary and the method further comprising:

applying an externally generated voltage differential between a segment of the third conductor layer and a segment of the second conductor layer to control a pixel of the display.

\* \* \* \* \*